May 9, 1961 W. C. LANNING 2,983,826

BINARY DIGITAL COUNTER

Filed Oct. 26, 1955 2 Sheets-Sheet 1

INVENTOR
WALTER C. LANNING
BY R. J. Craddock
ATTORNEY

BINARY DIGITAL COUNTER

Filed Oct. 26, 1955

INVENTOR
WALTER C. LANNING
BY
[signature]
ATTORNEY

United States Patent Office 2,983,826
Patented May 9, 1961

2,983,826

BINARY DIGITAL COUNTER

Walter Clayton Lanning, Plainview, N.Y., assignor to Sperry Rand Corporation, a corporation of Delaware Filed Oct. 26, 1955, Ser. No. 542,918

8 Claims. (Cl. 307—88)

This invention relates to electrical gating circuits and more particularly to bistable gating circuits for use in binary digital counting systems.

In a binary digital computer counting is a process which records the number of signals representing 1 that occur in succession at a particular terminal. In one type of binary digital computer these signals appear in trains, each train consisting of a system of periodically spaced discrete signal elements, each element representing the number 0 or the number 1. In such system, the 1 may be designated by an electrical pulse and the 0 by the absence of a pulse. Counting may be accomplished by a succession of steps, each step effectively dividing the total number of pulses received by a factor of two. A computer element, known as a bistable gating circuit, which is useful for performing the step of division by two is one which has two stable states, and in which each received pulse switches the element from the stable state in which it is operating to the other stable state. For example, in one stable state the bistable gating circuit may be continuously generating a series of pulses and in the other stable state no pulses are generated. Thus it would take two received pulses to cycle this gating circuit from a particular stable state back to that same state. If this gating circuit is coupled to a stage which produces an output pulse for only the first pulse generated in each pulse-type stable state, a division by two will have been accomplished.

It is therefore an object of this invention to provide a binary digital counter.

It is a further object of this invention to provide an improved electrical counting circuit for a binary digital computer.

It is a further object of this invention to provide a bistable gating circuit.

It is a further object of this invention to provide a circuit to produce an output signal of a given type for every two received input signals of the same type.

It is a further object of this invention to provide an improved binary digital counting circuit utilizing magnetic core logic elements.

In accordance with the present invention, there is provided a circuit for counting the number of electrical pulses in a train of periodically spaced discrete signal elements, wherein the presence of a pulse in an element designates the number 1 and the absence of a pulse the number 0. The signal train is coupled into an EXCLUSIVE-OR logical element, the output of which is delayed for one period and coupled back to the input in parallel with the signal train. This circuit will thus circulate a periodically recurring series of 1's, represented by pulses, or a periodic series of 0's represented by the absence of pulses, each series representing one of the two possible stable states in which the circuit can operate. The occurrence of a pulse in a signal element of the input signal train triggers this circuit from the state in which it may be operating to its other stable state. The input signal train and the delayed output of the EXCLUSIVE-OR logical element are coupled in parallel to a CONJUNCTIVE logical element. The coincidence of a pulse in the signal train and the pulse-type state of operation of the bistable circuit causes the CONJUNCTIVE logical element to deliver a 1 as a pulse at its output terminal. This pulse is delivered for every two pulses occurring in the input signal train and, therefore, the circuit divides the number of incoming pulses by two. By coupling a plurality of these circuits in tandem, any number of incoming pulses may be counted.

Other objects and advantages of the present invention will become apparent from the specification taken in connection with the accompanying drawings wherein.

In the following description and claims, certain mathematical operations which are peculiarly applicable to binary digital computation and which are useful in explaining this invention may be defined as follows:

CONJUNCTION—Yields a 1 out if both inputs are 1.

| A \ B | 0 | 1 |
|---|---|---|
| 0 | 0 | 0 |
| 1 | 0 | 1 |

This operation is performed by a CONJUNCTIVE logical element.

EXCLUSIVE-OR—Yields 1 out if the inputs are unlike.

| A \ B | 0 | 1 |
|---|---|---|
| 0 | 0 | 1 |
| 1 | 1 | 0 |

This operation is performed by an EXCLUSIVE-OR logical element.

DISJUNCTION—Yields a 1 out if the inputs are unlike or both 0's.

| A \ B | 0 | 1 |
|---|---|---|
| 0 | 1 | 1 |
| 1 | 1 | 0 |

This operation is performed by a DISJUNCTIVE logical element.

Figure 1:
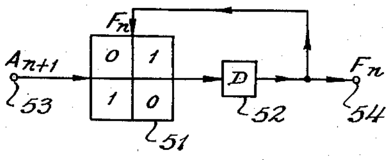
Fig. 1 is a diagram useful in explaining the theory of operation of the bistable gating circuit of this invention.

Referring now to Fig. 1 there is shown a diagram of the logical operations of the bistable gating circuit of this invention. In this type of figure the matrix is employed to represent logical functions defined in the preceding table of definitions. The matrices are shown interconnected by lines which represent the direction and order of transference of signals through the circuit. The block containing the symbol D represents a delay element. The lines terminating at the left side of the matrices represent digit inputs to the matrix rows, the top row representing a 0 input and the bottom row a 1 input, whereas the lines terminating at the top of the matrices represent digit inputs to the matrix columns, the left column representing a 0 input and the right column a 1 input. Thus the inputs to a matrix 51, which represents the logical function of EXCLUSIVE-OR, is shown to be $A_{n+1}$, the input signal to the rows, and $F_n$, the circulating signal to the columns. The output of matrix 51, shown by the line from the right side of the matrix, is given by an EXCLUSIVE-OR operation on the input, or $$F_{n+1}=A_{n+1}F'_n+A'_{n+1}F_n \qquad (1)$$

This equation is formulated in Boolean algebra, a branch of mathematics well suited to express mathematical relationships in a binary number system. In this notation the primed symbols indicate the NOT of the unprimed symbols. The NOT of an unprimed number is its opposite number; that is, the NOT of 1 is 0, and vice versa. terminal 53, consisting of a system of periodically spaced discrete signal elements, each element representing the number 0 or the number 1. The particular signal element entering the rows of matrix 51 is shown to be $A_{n+1}$. The output signals of matrix 51 are coupled to a delay element 52 which introduces in the signals delay equal to the period between the signal elements of train A, i.e. the signal element repetition period. The output signals of delay element 52 are coupled back to matrix 51 where they serve as an input signal to the columns. Since the delay in the circuit through the EXCLUSIVE-OR element and the delay element is equal to the signal element repetition period, a signal element $A_{n+1}$ will arrive at the input terminal 53 of the EXCLUSIVE-OR element approximately at the same time that the delayed output signal $F_n$ from said EXCLUSIVE-OR element in response to the immediately preceding signal element $A_n$ will arrive at the other input terminal of the EXCLUSIVE-OR element thus to provide the logic illustrated in Formula 1. The particular signal element entering the columns of matrixx 51 is designated as $F_n$, which is also the output of the circuit at terminal 54. If the input signal element is 0, as designated by the top row of the matrix, $F_n$ will continue to circulate. On the other hand if the signal element is a 1 as designated by the bottom row of the matrix, the circulating signal in the loop will transfer from an 0 to a 1 or from a 1 to an 0. Thus, this circuit has two stable states of operation respectively represented by a circulating 0 and a circulating 1, the state of operation being switched by an input 1.

Figure 2:
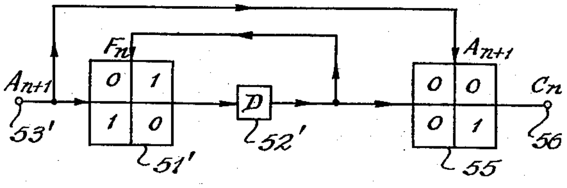
Fig. 2 is a diagram useful in explaining the theory of operation of the counting circuit of this invention.

A diagram of the logical operations of the counting circuit of this invention is shown in Fig. 2 and incorporates as an integral component the bistable gating circuit of 1. The bistable gating circuit component includes the EXCLUSIVE-OR matrix 51', the delay element 52', and the input terminal 53'. The input signal train is also coupled to a matrix 55, which represents the logical function of CONJUNCTION. The second input to matrix 55 is the output $F_n$ of the delay element 52'. The output of matrix 55 is a 1 only when its two inputs One input to matrix 51 is a signal train A, applied at are each 1. The counter output $C_n$ delivered at terminal 56 is given by the following CONJUNCTIVE OPERATION, $$C_n=A_{n+1}F_n \qquad (2)$$

However, $F_n$ depends on the preceding circulating term $F_{n-1}$ and the preceding input signal element $A_n$. Therefore, equation (2) may be rewritten in further detail as, $$C_n=A_{n+1}(A_nF'_{n-1}+A'_nF_{n-1}) \qquad (3)$$

Thus, as indicated in Equation 3, even though a 1 may circulating in the bistable gating circuit, a condition designated by $F_n=1$, the output of the counting circuit will not be a 1 unless the input signal element $A_{n+1}$ is a 1.

Figure 3:
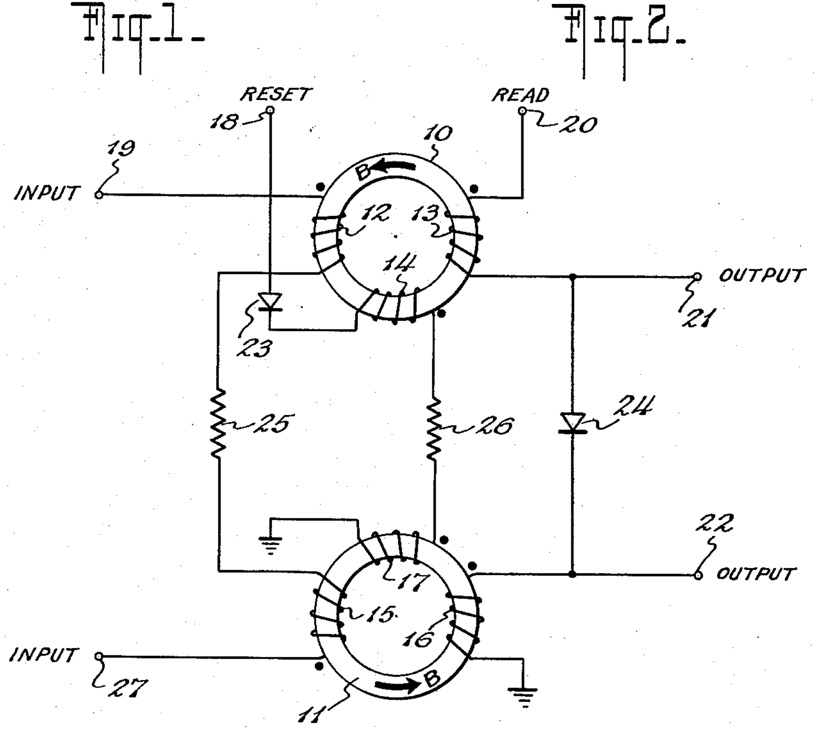
Fig. 3 is a schematic diagram of a circuit element suitable for use in the practice of this invention.

A particular circuit element which is suitable for use in a binary digital computing circuit and which facilitates assemblage of the instant counting circuit according to the principles described, is shown in Fig. 3. For purposes of simplicity, this circuit element will henceforth be termed a functor. The functor comprises a pair of toroidal magnetic cores 10 and 11, on each core there being wound an input, an output, and a reset winding. Input winding 12, output winding 13, and reset winding 14 are wound on core 10. Input winding 15, output winding 16, and reset winding 17 are wound on core 11. The magnetization effect of each winding on its core is indicated by the presence of a dot near one end or terminal of the winding. Positive current entering the dotted terminal of any winding tends to set up magnetic flux in the core in the arbitrarily assigned positive direction, as shown by the arrows.

Figure 4:
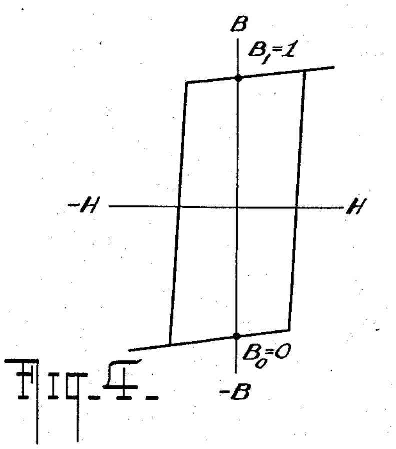
Fig. 4 is a graph illustrating the hysteresis loop of a magnetic material used in the element of Fig. 3.

An idealized hysteresis loop of the cores of the functor is shown in Fig. 4. These cores have the property of low coercive force and high residual magnetism. A core may be readily magnetized with a given direction of residual magnetic field or into a given remanence state by applying sufficient current of proper polarity to any of its windings to drive the core to saturation. A core is magnetized into the defined unity remanence state by applying positive saturating current to the dotted terminal of any of its windings. Similarly, a core is magnetized into the zero remanence state by applying positive saturating current to the undotted terminal of any of its windings. Thus, if a core is in the zero state, a large positive pulse of current entering the dotted terminal of any one of its windings is sufficient to change the remanence state from zero to unity. On the other hand, with the core in the zero state, if the positive pulse of current enters the winding at the undotted terminal, no change of remanence state occurs and the core will remain magnetized in the zero state.

Figure 5:
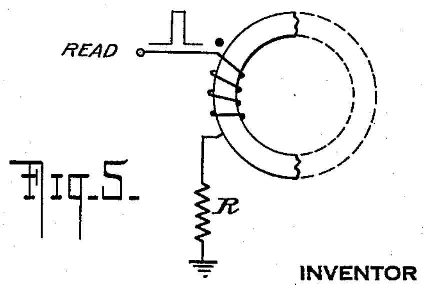
Fig. 5 is a circuit used to illustrate the operation of the element of Fig. 3.

To illustrate how pulses are read out of the functor, the exemplary circuit of Fig. 5 is used. In this circuit a coil wound on a magnetic core, such as is used in the functor, is shown in series with a resistance. If the core is in the zero remanence state, a positive pulse of current applied to the read terminal enters the winding at its dotted end and passes through the resistor to ground. The pulse of current tends to change the state of the core from zero to one and the residual magnetism from $B_0$ to $B_1$. This attempted change of flux through its turns will induce a voltage in the winding, causing it to act as a high impedance. Thus, most of the voltage applied to the read terminal will appear across the winding and but a very small portion across the resistor. If the core is magnetized in the unity remanence state, a positive pulse of current applied to the dotted terminal of the coil tends to cause no change of remanence state. Consequently, there will be but little voltage induced in the winding, and it acts as a low impedance, so that most of the voltage applied to the read terminal will appear across the resistor.

The appearance of a pulse across the resistor of Fig. 5 occurs when the core is in a unity state. Hence, the output pulse on the resistor when the core is in the unity state may be considered to be an output of unity. The absence of an output pulse when the core is in the zero state may be considered to be an output of zero. Therefore, in this functor and in its associated circuitry, the presence of a pulse indicates the presence of the digit 1 and the absence of a pulse the presence of the digit 0.

The windings of the functor are energized by positive pulses from a clock source. The clock source delivers periodic trains of pulses at a plurality of terminals. While the periods of all pulse trains are alike, the pulses in different trains are displaced in time. The functor reset terminal 18 and read terminal 20 are connected directly to different terminals of the clock source. The input terminal 19 is connected to another terminal of the clock source either directly or through intermediate circuitry which may or may not permit passage of the particular clock pulse to the input terminal 19. It is necessary that the terminals of the clock source be so selected that the cyclical order of pulses energizing the functor windings follow the pattern of reset, input, and read.

The clock pulses applied to reset terminal 18 enter reset winding 14 at its undotted end and reset winding 17 at its dotted end, thereby setting core 10 to 0 and core 11 to 1. A positive pulse applied to input terminal 19 enters input winding 12 at its dotted end and input winding 15 at its undotted end. If no input pulse reaches input terminal 19 during a particular clock cycle, the cores remain in their reset state. However, if a pulse enters input terminal 19, core 10 is set to 1 and core 11 is set to 0.

A pulse applied to read terminal 20 enters winding 13 at its dotted end. Output terminal 21 acts only as a current source. If core 10 is set to 0, the output winding 13 acts as a high impedance and little current can flow from output terminal 21. Thus, the output signal from output terminal 21, will be a 0 in accordance with the principles explained in connection with Fig. 5. If core 10 is set to 1, the output winding 13 acts as a low impedance and an output pulse, representing the number 1, will appear at output terminal 21.

Output terminal 22, which acts only as a current sink, is connected through intermediate circuitry to the same terminal of the clock source as read terminal 20. With core 11 set to 0, output winding 16 acts as a high impedance and prevents current flow in the intermediate circuitry. Thus, the signal from the terminal 22 may be said to be a 0. If core 11 is set to 1, output winding 16 acts as a low impedance and permits current to flow in the intermediate circuit connected to terminal 22. Thus, the signal from terminal 22 may be said to be a 1.

Summarizing the above analysis, if the input signal to the functor is 1, the output signal of terminal 21 is 1, and the output signal of terminal 22 is 0. On the other hand, if the input signal is 0, the output signal of terminal 21 is 0, and the output signal of terminal 22 is 1. The electrical significance of such a result is that with an input of 1, the functor will deliver a pulse at one output terminal, but will not allow reception of a pulse at the other output terminal. If the input is 0, the functor will deliver no pulse at one output terminal, but will allow reception of a pulse at the other output terminal. A functor which operates in this manner is designated a functor zero.

If the output windings of the two cores are each wound in the opposite direction from that of Fig. 3, the functor will perform in an opposite manner. In this case, an input 1 will yield an output of 0 at terminal 21 and an output of 1 at terminal 22. Again expressing its operation electrically, if the input is 1, the functor will not deliver a pulse at one output terminal, but will allow reception of a pulse at the other output terminal. Such a functor is designated as a functor one.

In its use in a computing circuit a functor is interconnected with other functors. Thus, in the functor of Fig. 3, the input terminal 19 is connected to a current source output terminal of a preceding functor. The input terminal 27 is connected to a current sink output terminal of a preceding functor. Similarly, output terminals 21 and 22 are connected to input terminals of succeeding functors. Thus, input windings 12 and 15 are in series with each other and in series with a preceding current source output terminal and a preceding current sink output terminal. Only if both the preceding current source and the preceding current sink generate an output signal of 1 does a current pulse flow in the input windings 12 and 15. If either or both of the preceding functors generates an output signal of 0, a 0 signal will be applied to the input windings 12 and 15. Thus, the functor zero of Fig. 3 yields a 1 at its current source output terminal 21 only if both inputs are 1, and therefore, acts basically as a CONJUNCTIVE logical element.

In similar manner, the functor one yields a 1 at its current source output terminal if the inputs are either 1–0 or 0–1, or both 0, and, therefore, acts basically as a DISJUNCTIVE logical element.

Figures 6, 7, 8, 9:
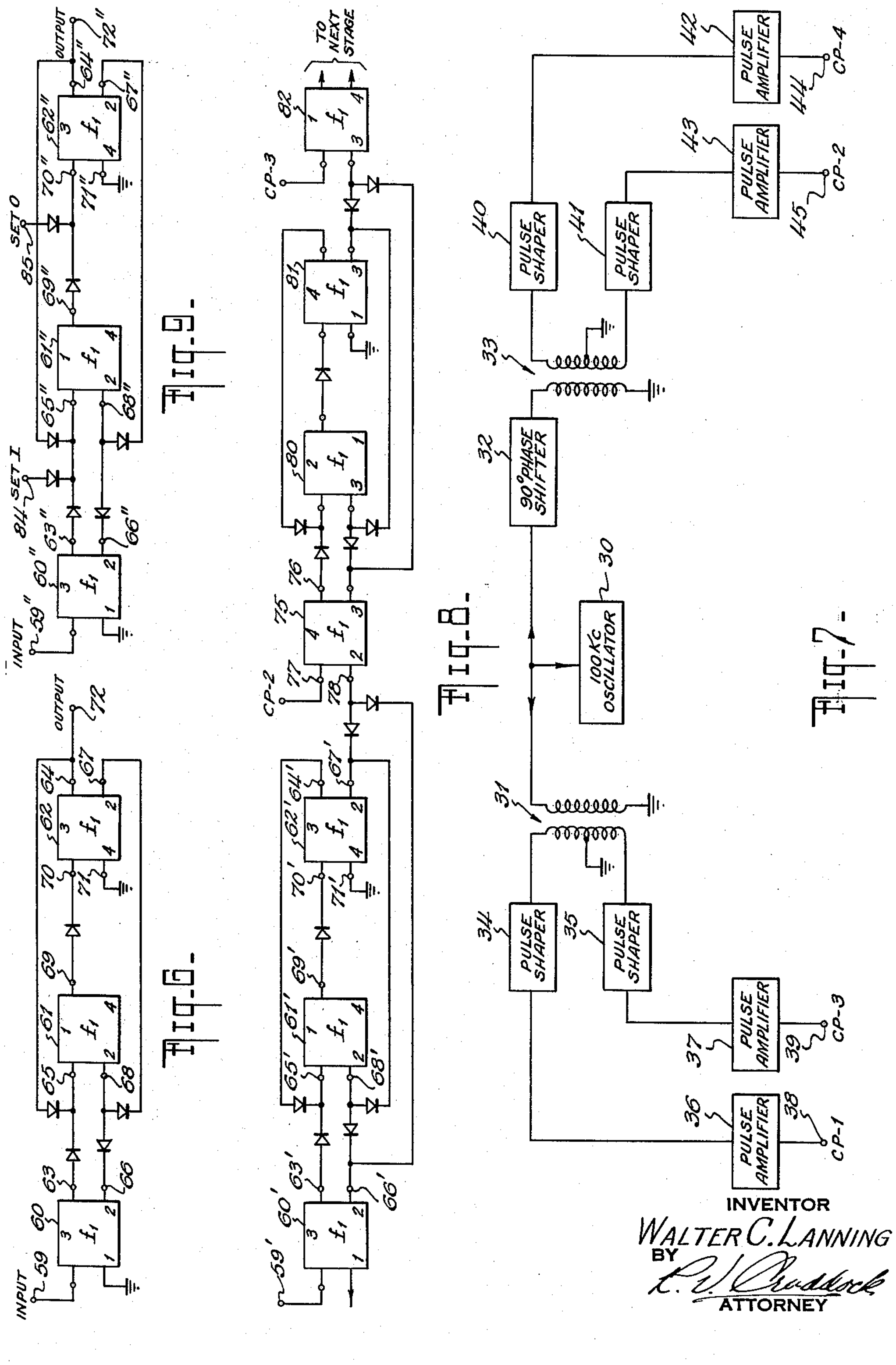
Fig. 6 is a circuit diagram of the bistable gating circuit of this invention.
Fig. 7 is a circuit diagram of a clock source to be used in conjunction with circuit of Fig. 6.
Fig. 8 is a circuit diagram of the preferred counting circuit of this invention.
Fig. 9 is a circuit diagram of a modified embodiment of the gating circuit of Fig. 6.

The bistable gating circuit of this invention, as shown in detail in Fig. 6, is constructed by proper interconnection of a plurality of functor elements of the type described. In this figure the functor elements are shown as blocks having four possible terminals, the two terminals on the left of each block representing the input terminals and the two terminals on the right representing the output terminals. The upper output terminal is the current source terminal and the lower output terminal is the current sink terminal. This circuit is capable of operating in either one of two stable states. A proper trigger delivered at the input terminal of the circuit will switch the operation from the stable state in which the circuit is operating to its other stable state.

A clock source for delivering positive pulses to the reset, input, and output windings is shown in Fig. 7. The clock source delivers four clock pulses spaced 90° apart during one clock cycle, the clock cycles recurring at 100 kc. A 100 kc. oscillator 30 determines the recurrence frequency of the clock pulses. The output signal of oscillator 30 is split into two portions, one portion being applied to the primary winding of a transformer 31 and the other portion, after being delayed by 90° in phase shifter 32, being applied to the primary winding of a transformer 33. The secondary winding of transformer 31 is center tapped in order to provide two signals, one from each end of the secondary winding, 180° out of phase with each other. The two signals from the secondary winding of transformer 31 are passed through respective pulse shaper networks 34 and 35 and respective pulse amplifiers 36 and 37 to clock pulse terminals 38 and 39. The secondary winding of transformer 33 is center tapped in order to provide two signals, one from each end of the secondary winding, 180° out of phase with each other, and also 90° out of phase with respect to corresponding signals delivered by the secondary winding of transformer 31. The two signals from the secondary winding of transformer 33 are passed through respective pulse shaper networks 40 and 41 and respective amplifiers 42 and 43 to clock pulse terminals 44 and 45. Thus, the output of the clock source is a series of recurring positive pulses from each of four output terminals. The pulse recurrence frequency of the signal from each terminal is 100 kc. One pulse is delivered from each of the terminals during each cycle of oscilaltor 30. The clock pulses are delivered in cyclical order from terminals 38, 45, 39, and 44. Terminals 38, 45, 39 and 44 are respectively labeled CP–1, CP–2, CP–3, and CP–4 to indicate the cyclical order of the clock pulse available at that terminal.

Referring again to Fig. 6, in the block representing each functor is a series of numerals designating clock pulse numbers. The numeral in the lower left corner indicates the number of the clock pulse which energizes the input windings of the functor. The numeral in the lower right corner indicates the number of the clock pulse which energizes the output windings of the functor. The numeral in the top center portion of the block indicates the number of the clock pulse which resets the functors.

In operation, a train of periodically spaced discrete signal elements, wherein the presence of an electrical pulse in an element designates the number 1 and the absence of a pulse the number 0, is applied at an input terminal 59. Input terminal 59 is connected to one input terminal of a functor 60, which in turn is interconnected to a pair of functors 61 and 62. Functors 60, 61 and 62 are all of the functor one type. The current source output terminals 63 and 64 of respective functors 60 and 62 are connected in parallel to input terminal 65 of functor 61. The current sink output terminals 66 and 67 of respective functors 60 and 62 are connected in parallel to the other input terminal 68 of functor 61. The current source output terminal 69 of functor 61 is connected to one input terminal 70 of functor 62. The other input terminal 71 of functor 62 is connected to ground. The signal delivered at the current source output terminal 64 of functor 62 may be used as the output signal of the circuit, and hence terminal 64 is also connected to an output terminal 72.

For a better understanding of the operation of this circuit the following table is included:

*Table I*

| | Clock Pulse 2 | | | | | Clock Pulse 4 | |
|---|---|---|---|---|---|---|---|
| Functor | 62 out ($F_n$) | | 60 out ($A_{n+1}$) | | 61 in | 61 out | 62 in |
| Terminal | Upper | Lower | Upper | Lower | | | |
| Line 1 | 0 | 1 | 0 | 1 | 0 | 1 | 1 |
| Line 2 | 0 | 1 | 0 | 1 | 0 | 1 | 1 |
| Line 3 | 0 | 1 | 1 | 0 | 1 | 0 | 0 |
| Line 4 | 1 | 0 | 0 | 1 | 1 | 0 | 0 |
| Line 5 | 1 | 0 | 0 | 1 | 1 | 0 | 0 |
| Line 6 | 1 | 0 | 1 | 0 | 0 | 1 | 1 |
| Line 7 | 0 | 1 | 0 | 1 | 0 | ------ | ------ |

Assume that a zero signal has been circulating in the circuit and that a zero signal is applied to the circuit from terminal 63 of functor 60. This operation is indicated in line 1 of Table I. (The term "circulating" refers to the signal output which is inserted back in the circuit at terminal 65.) These two signals are delivered to input terminal 65 of functor 61 and constitute a zero input to that functor. Since functor 61 is of the functor one type its output will be a 1. Clock pulses are delivered to the circuit so that signals are read from functors 60 and 62 and into functor 61 on clock pulse 2, and signals are read from functor 61 and into functor 62 on clock pulse 4. Thus the input to functor 62 on clock pulse 4 will be a 1 from functor 61. The output of functor 62 which is of the functor one type will be a 0 as shown in line 2. Line 2 again assumes a 0 input from terminal 63 and thus there remains a 0 input to functor 61. Consequently lines 1 and 2 illustrate the operation of the circuit in the zero state, wherein the output from terminal 72 will be a continuous series of 0's. Line 3 illustrates the reception of a 1 from terminal 63. This trigger pulse from current source terminal 63 passes into input terminal 65, through the input windings of functor 61, out of input terminal 68, and into output terminal 67 of functor 62. Since functor 62 is delivering a 0 at its current source output terminal 64 it will simultaneously receive a pulse at its current sink output terminal 67. Therefore, the 1 applied from terminal 63 on clock pulse 2 will be stored in functor 61, and will result in a 0 being delivered at terminal 69 to functor 62 on clock pulse 4. The output of functor 62 at terminal 64 will be a 1, as shown in line 4, during which time it is assumed that there is no input trigger signal from terminal 63. The pulse delivered at terminal 64 will enter terminal 65 and leave terminal 68 of functor 61. The circuit for this pulse is completed through output terminal 66 of functor 60, which on clock pulse 2 is delivering no pulse at its current source output terminal and consequently can receive a pulse at its current sink output terminal 66. Lines 4 and 5 of Table I demonstrate this circulation of a pulse when the circuit is operating in the one state. Line 6 illustrates the operation of the circuit with a trigger input from terminal 63 when a 1 is circulating. Thus there is a 1 out of both terminals 64 and 63 of respective functors 62 and 60. However, since each of these functors is delivering a 1 at its current source output terminal it cannot receive a 1 at its current sink output terminal. There is no complete path for current to flow through the input windings of functor 61, and therefore the simultaneous occurrence of two 1's at the input to functor 61 will cause a zero to be stored in this functor. Thus, the output of functor 61 will be a 1 which is delivered to functor 62 and causes a 0 to circulate in the circuit.

To summarize the operation of this circuit, lines 1 and 2 illustrate the operation of the circuit in the zero state, line 3 illustrates the switching of the circuit to the one state by the application of a trigger input pulse when the circuit is in its zero state, lines 4 and 5 illustrate the operation of the circuit in the one state, and line 6 illustrates the switching of the circuit to the zero state by the application of a trigger input pulse when the circuit is in its one state. With no input pulse the circuit remains in the state in which it is operating. If the circuit is in the zero state an input pulse changes it to the one state. If the circuit is in the one state an input pulse changes it to the zero state. Thus the circuit acts as an EXCLUSIVE-OR logical element.

The diagram of the counting circuit of this invention is shown in Fig. 8. In this circuit functors 60', 61', and 62' and their associated circuitry operate in a manner identical with the bistable gating circuit described in connection with Fig. 6. The input to the counting circuit is a train of periodically spaced discrete signal elements, wherein each element may or may not contain a pulse and in which the number of pulses in the signal train is to be counted by this circuit. The combination of functors 61', 62' and 75 constitute one element of the counting circuit, this element serving to divide the number of incoming pulses by a factor of two. That is, for every two pulses delivered to the circuit at terminal 63', one pulse will be delivered by the circuit at terminal 76.

Functor 75, which is of the functor one type, has one input terminal 77 connected directly to the CP–2 terminal of the clock source. Its other input terminal 78 is connected to the parallel current sink output terminals 66' and 67' of respective functors 60' and 62'.

The operation of this circuit may be more readily understood by reference to Table II:

*Table II*

| | Clock Pulse 2 | | | | | | Clock Pulse 3 | Clock Pulse 4 | |
|---|---|---|---|---|---|---|---|---|---|
| Functor | 62' out ($F_n$) | | 60' out ($A_{n+1}$) | | 61' in | 75 in | 75 out | 61' out | 62' in |
| Terminal | Upper | Lower | Upper | Lower | | | | | |
| Line 1 | 0 | 1 | 0 | 1 | 0 | 1 | 0 | 1 | 1 |
| Line 2 | 0 | 1 | 0 | 1 | 0 | 1 | 0 | 1 | 1 |
| Line 3 | 0 | 1 | 1 | 0 | 1 | 1 | 0 | 0 | 0 |
| Line 4 | 1 | 0 | 0 | 1 | 1 | 1 | 0 | 0 | 0 |
| Line 5 | 1 | 0 | 0 | 1 | 1 | 1 | 0 | 0 | 0 |
| Line 6 | 1 | 0 | 1 | 0 | 0 | 0 | 1 | 1 | 1 |
| Line 7 | 0 | 1 | 0 | 1 | 0 | 1 | 0 | ------ | ---- |

The operation of the bistable gating circuit portion of the counting circuit is described in Table II by the columns for functors 60', 61' and 62'. This circuit changes from the stable state in which it is operating to its other stable state upon the application of each input pulse from terminal 63'. Since the one state is a continuous series of circulating pulses, it is necessary that the counting circuit be responsive to only one of the circulating pulses in order to divide the number of incoming pulses by two. This is accomplished by functor 75 as interconnected with the bistable gating circuit.

On clock pulse 2 a pulse is always applied to input terminal 77 of functor 75. If there is no path for this pulse to leave terminal 78 a 0 will be stored in functor 75 and a 1 will be read on clock pulse 3 from terminal 76. However, if there is a path for clock pulse 2 a 1 will be stored in functor 75 and a 0 subsequently read out. With the bistable gating circuit in its zero state, as shown in lines 1 and 2 of Table II, the current sink output terminals 66′ and 67′ each permit the passage of current and therefore the storage of a 1 in functor 75. With the gating circuit in the zero state and a pulse applied at terminal 63′, as shown in line 3, there is still a path for current to flow through current sink terminal 67′ of functor 62′, and thus under this condition a 1 is again stored in functor 75. Lines 4 and 5 illustrate the operation of the gating circuit in its one state. In this state there remains a path for the current pulse to flow through the input windings of functor 75 since the current sink terminal 66′ of functor 60′ permits the flow of current. Consequently on clock pulse 3 the output of functor 75 will remain a 0. Line 6 illustrates the application of a pulse from terminal 63′ when the gating circuit is in its one state. At this time a 1 is available from the current source output terminals 63′ and 64′ of respective functors 60′ and 62′. Consequently the current sink output terminals of these two functors will not accept a pulse. Thus there is no path for a current pulse to flow through the input windings of functor 75 and a 0 will be stored therein. On the next clock pulse 3, a 1 will be read from output terminal 76 of functor 75. Hence, as expressed mathematically in Equation 2, once each full cycle of operation of the bistable gating circuit, a cycle which requires the application of two input pulses, an output pulse is delivered by functor 75.

To further subdivide the number of input pulses, additional circuits which divide by two may be connected in tandem to the one above described. Thus, in Fig. 8 the functors 80, 81 and 82 constitute a second counting circuit. The output of this circuit is but one pulse for every four incoming pulses from terminal 63′.

A modified version of the bistable gating circuit of Fig. 6 is that of Fig. 9. Not only is this circuit capable of alternately changing its states in response to input trigger pulses, but the state of the circuit may be particularly selected. As shown in the figure the functors 60″, 61″, and 62″ constitute the basic bistable gating circuit described in Fig. 6. If the circuit is in its zero state a 0 is circulating from output terminal 64″ of functor 62″ to input terminal 65″ of functor 61″. If a pulse is applied to the Set 1 terminal 84 on clock pulse 2, it will flow through the input windings of functor 61″ by virtue of two possible paths to ground, either through the output terminal 66″ of unctor 60″ or the output terminal 67″ of functor 62″. This pulse serves to store a 1 in functor 61″, which will then deliver a 0 at its output terminal 69″ on the next clock pulse 4, thereby changing the state of the circuit. If a 1 is circulating in the circuit, a 0 will flow from output terminal 69″ of functor 61″ to input terminal 70″ of functor 62″. If a pulse is applied to the Set 0 terminal 85 on clock pulse 4, a 1 will be stored in functor 62″, which will deliver a 0 at terminal 64″ on the next clock pulse 2, thereby changing the state of the circuit.

While the functors used and their interconnections described in reference to the circuit of Fig. 8 represent the preferred embodiment of this invention, many modifications may be made in the circuit without departing from the spirit of this invention. Thus functors 61′ and 62′ may be each of the functor zero type. In such case the signal which is circulating will be of the same type from terminal 64′ to 65′ as from terminal 69′ to terminal 70′. Likewise functors 61′ and 62′ may be of unlike types. In such case the input to the functor occupying the 62′ position would be from the current sink terminal of the functor occupying the 61′ position.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A device for counting the number of ones in a train of binary digits, said train consisting of a series of periodically spaced discrete signal elements, each element representing one of the numbers 0 and 1, comprising an EXCLUSIVE-OR logical element having two input terminals and an output terminal, said train being coupled to one of said input terminals of said EXCLUSIVE-OR logical element, a delay means having input and output terminals, said delay means being connected between the output terminal and the other of said input terminals of said EXCLUSIVE-OR logical element, the delay introduced by said means being equal to the signal element repetition period, and a CONJUNCTIVE logical element having two input terminals and an output terminal, said train and the output signal of said delay means being coupled to respective input terminals of said CONJUNCTIVE logical element, whereby said CONJUNCTIVE logical element delivers an output one for every pair of ones in said train.

2. A bistable gating circuit comprising first, second and third logical elements each capable of receiving two input signals representing respective binary digits at a pair of input terminals, storing a binary digit of one value when both of the input signals represent ones and a binary digit of the other value when any one of the input signals represents zero, and subsequently delivering a current pulse at a first output terminal when the stored digit has one value and offering a low impedance path for current to enter a second output terminal when the stored digit has the other value, a first output terminal of the second logical element being connected to an input terminal of the third logical element, said first output terminals of the first and third logical elements being connected in parallel to one input terminal of the second logical element and said second output terminals of the first and third logical elements being connected in parallel to the other input terminal of the second logical element.

3. A circuit for counting the number of ones in a train of binary digits, said train consisting of a series of periodically spaced discrete signal elements, each element representing one of the numbers 0 and 1, comprising first, second, third and fourth logical elements each capable of receiving two input signals representing respective binary digits at a pair of input terminals, storing a binary digit of one value when both of the input signals represent ones and a binary digit of the other value when any one of the input signals represents zero, and subsequently delivering a current pulse at a first output terminal when the stored digit has one value and offering a low impedance path for current to enter a second output terminal when the stored digit has the other value, a first output terminal of the second logical element being connected to an input terminal of the third logical element, said first output terminals of the first and third logical elements being connected in parallel to one input terminal of the second logical element, said second output terminals of the first and third logical elements being connected in parallel to the other input terminal of the second logical element and said second output terminals of said first and third logical elements being connected in parallel to one input terminal of said fourth logical eltment.

4. A binary digital counting circuit comprising first, second, third and fourth functors, a current source output terminal of said second functor being connected to an input terminal of said third functor, the current source output terminals of said first and third functors being connected in parallel to one input terminal of said second functor and the current sink output terminals of said first and third functors being connected in parallel to the other input terminal of said second functor, the current sink output terminals of said first and third functors being connected in parallel to one input terminal of said fourth functor.

5. A device for counting the number ones in a train of binary digits, said train consisting of a series of periodically spaced discrete signal elements, each element representing one of the numbers 0 and 1, comprising an EXCLUSIVE-OR logical element having two input terminals and an output terminal, said train being coupled to one of said input terminals of said EXCLUSIVE-OR logical element, delay means having input and output terminals, and a circuit including said delay means connected between the output terminal and the other of said input terminals of said EXCLUSIVE-OR logical element, thereby forming a loop including the EXCLUSIVE-OR logical element and the delay means, the output terminal of the EXCLUSIVE-OR element being connected to the input terminal of the delay means, and the output terminal of the delay means being connected to the input of the EXCLUSIVE-OR element, the total delay of said loop, being equal to the signal element repetition period, and a CONJUNCTIVE logical element having two input terminals and an output terminal, said train and the output signal of said delay means being coupled to respective input terminals of said CONJUNCTIVE logical element, whereby said CONJUNCTIVE logical element delivers an output one for every pair of ones in said train.

6. A bistable gating circuit responsive to periodic binary digits comprising first, second and third logical elements each capable of receiving two input signals representing respective binary digits at a pair of input terminals, storing a binary digit of one value when both of the input signals represent ones and a binary digit of the other value when any one of the input signals represents zero, and subsequently delivering a current pulse at a first output terminal when the stored digit has one value and offering a low impedance path for current to enter a second output terminal when the stored digit has the other value, a first output terminal of the second logical element being connected to an input terminal of the third logical element, said first and second output terminals of the first logical element being connected respectively to one and the other input terminals of the second logical element, and loop means comprising said second and third logical elements, said first and second output terminals of the third logical element being connected respectively to said one and the other input terminals of the second logical element, said loop means having a total delay time equal to the repetition period of said binary digits.

7. A circuit for counting the number of ones in a train of binary digits, said train consisting of a series of periodically spaced discrete signal elements, each element representing one of the numbers 0 and 1, comprising first, second, third and fourth logical elements each capable of receiving two input signals representing respective binary digits at a pair of input terminals, storing a binary digit of one value when both of the input signals represent ones and a binary digit of the other value when any one of the input signals represents zero, and subsequently delivering a current pulse at a first output terminal when the stored digit has one value and offering a low impedance path for current to enter a second output terminal when the stored digit has the other value, a first output terminal of the second logical element being connected to an input terminal of the third logical element, said first and second output terminals of the first logical element being connected respectively to one and the other of said input terminals of the second logical element, and loop means comprising said second and third logical elements, said first and second output terminals of the third logical elements being connected respectively to one and the other of the input terminals of the second logical element, the delay time of said loop means being equal to the repetition period of said signal elements, and said second output terminals of said first and third logical elements being connected in parallel to one input terminal of said fourth logical element.

8. A circuit for counting the number of ones in a train of binary digits, said train consisting of a series of periodically spaced discrete signal elements, each element representing one of the numbers 0 and 1, comprising first, second, third and fourth logical elements each capable of receiving two input signals representing respective binary digits at a pair of input terminals, storing a binary digit of one value when both of the input signals represent ones and a binary digit of the other value when any one one of the input signals represents zero, and subsequently delivering a current pulse at a first output terminal when the stored digit has one value and offering a low impedance path for current to enter a second output terminal when the stored digit has the other value, a first output terminal of the second logical element being connected to an input terminal of the third logical element, said first output terminals of the first and third logical elements being connected in parallel to one input terminal of the second logical element, said second output terminals of the first and third logical elements being connected in parallel to the other input terminal of the second logical element, said second and third elements having a total delay time equal to the signal element repetition period, and said second output terminals of said first and third logical elements being connected in parallel to one input terminal of said fourth logical element.

References Cited in the file of this patent

UNITED STATES PATENTS

| | | |
|---|---|---|
| 2,693,907 | Tootill | Nov. 9, 1954 |
| 2,694,521 | Newman et al. | Nov. 16, 1954 |
| 2,794,130 | Newhouse et al. | May 28, 1957 |
| 2,846,667 | Goodell et al. | Aug. 5, 1958 |
| 2,852,699 | Ruhman | Sept. 16, 1958 |
| 2,861,259 | Meyerhoff | Nov. 18, 1958 |

OTHER REFERENCES

Gray: Logical Description of Some Digital Computer Adders and Counters, Proc. I.R.E., January 1952, pp. 29–32.

Guterman et al.: Logical and Control Functions Performed with Magnetic Cores, Proc. I.R.E., March 1955, pp. 291–298.

Guterman et al.: A Transistor-Magnetic Core Circuit, I.R.E., convention record, part 4, March 1955, pp. 84–94.

UNITED STATES PATENT OFFICE
CERTIFICATE OF CORRECTION

Patent No. 2,983,826 May 9, 1961

Walter Clayton Lanning

It is hereby certified that error appears in the above numbered patent requiring correction and that the said Letters Patent should read as corrected below.

Column 3, line 61, strike out "One input to matrix 51 is a signal train A, applied at" and insert the same after "vice versa.", line 20, same column 3, as the beginning of a new paragraph; same column 3, line 70, after "may" insert -- be --; column 9, line 51, for "unctor" read -- functor --.

Signed and sealed this 24th day of October 1961.

(SEAL)
Attest:

ERNEST W. SWIDER
Attesting Officer

DAVID L. LADD
Commissioner of Patents

USCOMM-DC